United States Patent
Klajny et al.

(10) Patent No.: US 11,598,519 B2
(45) Date of Patent: Mar. 7, 2023

(54) FLUIDIZING GAS NOZZLE HEAD AND A FLUIDIZED BED REACTOR WITH MULTIPLE FLUIDIZING GAS NOZZLE HEADS

(71) Applicant: SUMITOMO SHI FW ENERGIA OY, Espoo (FI)

(72) Inventors: Marcin Klajny, Czestochowa (PL); Kari Kauppinen, Varkaus (FI)

(73) Assignee: SUMITOMO SHI FW ENERGIA OY, Espoo (FI)

( * ) Notice: Subject to any disclaimer, the term of this patent is extended or adjusted under 35 U.S.C. 154(b) by 665 days.

(21) Appl. No.: 16/607,636

(22) PCT Filed: Apr. 28, 2017

(86) PCT No.: PCT/EP2017/060194
§ 371 (c)(1),
(2) Date: Oct. 23, 2019

(87) PCT Pub. No.: WO2018/196997
PCT Pub. Date: Nov. 1, 2018

(65) Prior Publication Data
US 2020/0072460 A1 Mar. 5, 2020

(51) Int. Cl.
*F23C 10/20* (2006.01)
*B05B 1/14* (2006.01)
(Continued)

(52) U.S. Cl.
CPC ............. *F23C 10/20* (2013.01); *B01J 4/002* (2013.01); *B01J 8/1827* (2013.01); *B01J 8/44* (2013.01);
(Continued)

(58) Field of Classification Search
CPC .......... F23C 10/20; B01J 4/002; B01J 8/1827; B01J 8/44; B01J 2208/00902; B01J 2208/00938; B05B 1/14
See application file for complete search history.

(56) References Cited

U.S. PATENT DOCUMENTS 3,256,612 A * 6/1966 Dollinger ............... B01J 8/1818
432/15
3,672,577 A 6/1972 Kramer
(Continued)

FOREIGN PATENT DOCUMENTS

CA 1151474 A 8/1983
CN 1227338 C * 11/2005 ................ C10J 3/20
(Continued)

OTHER PUBLICATIONS

Office Action dated Apr. 23, 2021, issued in corresponding Japanese Patent Application No. 2019-553925 (with English translation).
(Continued)

*Primary Examiner* — Kaity V Chandler
(74) *Attorney, Agent, or Firm* — Venable LLP

(57) ABSTRACT

A fluidizing gas nozzle head suitable to be connected to a fluidizing gas feeding device of a fluidized bed reactor. The fluidizing gas nozzle head includes an inlet channel having a longitudinal axis, an inlet end, and a second end, the inlet end of the inlet channel being adapted to connect the inlet channel in vertical gas flow connection with the fluidizing gas feeding device, four outlet channels, each of the four outlet channels extending from a first end to an outlet end, and a gas distribution space having a bottom face and a ceiling opposite to the bottom face. The second end of the inlet channel and the first ends of the four outlet channels are connected to direct gas flow connection with the gas distribution space. Each of the first ends of the four outlet
(Continued)

channels has a central point, which central points define a rectangle with two long sides and two short sides having an aspect ratio of at least 2:1.

30 Claims, 4 Drawing Sheets

(51) Int. Cl.
  *B01J 4/00* (2006.01)
  *B01J 8/18* (2006.01)
  *B01J 8/44* (2006.01)

(52) U.S. Cl.
  CPC ....... *B05B 1/14* (2013.01); *B01J 2208/00902* (2013.01); *B01J 2208/00938* (2013.01)

(56) References Cited

U.S. PATENT DOCUMENTS

| | | | |
|---|---|---|---|
| 3,708,887 A | | 1/1973 | Erisman |
| 3,746,516 A | * | 7/1973 | Michaud ............ B01J 8/44 261/122.1 |
| 3,896,996 A | * | 7/1975 | Roest ............ B01J 8/1827 239/600 |
| 3,933,445 A | | 1/1976 | Mueller et al. |
| 4,165,040 A | * | 8/1979 | Beacham ............ F27B 15/10 431/170 |
| 4,402,665 A | | 9/1983 | Korenberg |
| 4,427,375 A | * | 1/1984 | Di Rosa ............ F23C 10/20 431/170 |
| 4,469,487 A | * | 9/1984 | Peters ............ C10J 3/482 48/77 |
| 4,526,111 A | | 7/1985 | Mischke |
| 4,660,768 A | | 4/1987 | Bunthoff et al. |
| 4,673,552 A | * | 6/1987 | Li ............ B01J 8/1827 422/220 |
| 4,687,642 A | * | 8/1987 | Nielsen ............ B01J 8/1827 261/78.2 |
| 4,702,891 A | * | 10/1987 | Li ............ B01J 8/22 422/220 |
| 4,841,884 A | | 6/1989 | Engstrom et al. |
| 4,864,944 A | * | 9/1989 | Engstrom ............ F23C 10/005 34/582 |
| 4,865,540 A | | 9/1989 | Fitzgerald |
| 4,933,149 A | * | 6/1990 | Rhee ............ B01J 8/44 422/220 |
| 4,966,101 A | * | 10/1990 | Maeda ............ F23M 5/00 122/4 D |
| 5,391,356 A | | 2/1995 | Thorman |
| 5,575,086 A | | 11/1996 | Hartman et al. |
| 2016/0016136 A1 | | 1/2016 | Campanella et al. |
| 2017/0003019 A1 | | 1/2017 | Brownlee |

FOREIGN PATENT DOCUMENTS

| | | | | |
|---|---|---|---|---|
| CN | 101545676 B | * | 7/2012 | ............ Y02E 20/34 |
| CN | 105927973 A | | 9/2016 | |
| DE | 3513764 A1 | | 10/1986 | |
| FR | 2512925 A1 | | 3/1983 | |
| JP | 10103618 A | | 4/1998 | |
| JP | 2009300043 A | | 12/2009 | |
| KR | 20050002234 A | | 1/2005 | |
| KR | 100725001 B1 | | 6/2007 | |
| KR | 1020130047091 A | | 5/2013 | |
| PL | 214447 B1 | | 8/2013 | |
| PL | 217984 B1 | | 9/2014 | |
| RU | 2536159 C2 | | 12/2014 | |
| SU | 663963 A1 | | 5/1979 | |

OTHER PUBLICATIONS

Examination Report dated Apr. 23, 2021, issued in corresponding Philippine Patent Application No. 1/2019/502397.
Decision to Grant dated Nov. 5, 2020, issued in corresponding Korean Application No. 10-2019-7031639.
Office Action dated Oct. 30, 2020, issued in corresponding Japanese Application No. 2019-553925.
Office Action dated Nov. 12, 2020, issued in corresponding Indian Application No. 201947048099.
Brazilian Office Action dated Jan. 25, 2022; issued in corresponding Brazilian Patent Application No. 112019021963-3N (with English machine translation).
Examination Report dated Jan. 25, 2022, issued in Saudi Arabia (no translation available).
Office Action dated Feb. 3, 2021, issued in corresponding Chinese Patent Application No. 201780089953.1.
Notification of and International Search Report and Written Opinion dated Jan. 12, 2018, in corresponding International Patent Application No. PCT/EP2017/060194.
Notification of and International Preliminary Report on Patentability dated Jul. 29, 2019, in corresponding International Patent Application No. PCT/EP2017/060194.
Malaysian Substantive Examination Clear Report dated Dec. 5, 2022, issued in corresponding Malaysian Patent Application No. PI2019005908 (3 pages).

* cited by examiner

FLUIDIZING GAS NOZZLE HEAD AND A FLUIDIZED BED REACTOR WITH MULTIPLE FLUIDIZING GAS NOZZLE HEADS

CLAIM OF PRIORITY

This application is a U.S. national stage application of International Application No. PCT/EP2017/060194, filed Apr. 28, 2017, now published as International Publication No. WO 2018/196997 A1 on Nov. 1, 2018.

BACKGROUND OF THE INVENTION

Field of the Invention

The present invention relates to a fluidizing gas nozzle head and a fluidized bed reactor with multiple fluidizing gas nozzle heads. Thus, the present invention especially relates to a fluidizing gas nozzle head suitable to be connected to a fluidizing gas feeding device, such as a wind box with vertical fluidizing gas feed pipes, of a fluidized bed reactor, for feeding fluidizing gas to the fluidized bed reactor.

Fluidized bed reactors, such as circulating or bubbling fluidized bed boilers or gasifiers, comprise a reaction chamber, defined by vertical side walls, a ceiling and a bottom plate, and have a fluidized bed of solid particles, such as sand, limestone, ash and fuel particles, maintained therein. The bed is fluidized by bringing fluidizing gas, such as combustion air, from a fluidizing gas supply, such as a so-called wind box arranged below the bottom plate or so-called air bars connected to the side walls of the reaction chamber, through fluidizing gas nozzles to the reaction chamber. The fluidizing gas is injected through the fluidizing gas nozzles into the reaction chamber in a predetermined, relatively high velocity, and in a predetermined direction.

Commonly used fluidizing gas nozzles of fluidized bed reactors are made of steel and comprise a vertical fluidizing gas feed pipe and a fluidizing gas nozzle head through which the fluidizing gas is guided horizontally or slightly downwards to the fluidized bed reactor either as evenly distributed to all directions or as directed to certain directions. The combination of a vertical fluidizing gas feed pipe and a fluidizing gas supply is below called a fluidizing gas feeding device, whereby the fluidizing gas nozzle head is connected to a fluidizing gas feeding device.

U.S. Pat. No. 5,575,086 shows a fluidizing gas nozzle construction comprising a vertical fluidizing gas feed pipe integrally connected to a fluidizing gas nozzle head portion. The fluidizing gas nozzle head portion comprises two or four cylindrical tubes disposed symmetrically at the sides of a top portion of the vertical fluidizing gas feed pipe at an angle of about twenty degrees from a horizontal plane towards the bottom plate of a fluidized bed reactor.

U.S. Pat. No. 3,708,887 shows a fluidizing gas nozzle construction comprising a vertical fluidizing gas feed pipe and a thick walled fluidizing gas nozzle head connected by a thread fitting to the vertical fluidizing gas feed pipe. The fluidizing gas nozzle head comprises a cylindrical gas distribution space and multiple symmetrically arranged and downwardly inclined outlet channels drilled through the side wall of the gas distribution space. According to another embodiment, the fluidizing gas nozzle head is T-shaped and comprises multiple downwards directed orifices is each of the horizontal extensions of the fluidizing gas nozzle head.

Polish Patent No. 217 984 B1 discloses a fluidizing gas nozzle head comprising an inlet channel with a vertical axis, a horizontally extending space on top of the inlet channel and two outlet channels connected to the end portions of the horizontally extending space, wherein the outlet channels comprise a vertical upper portion and a lower portion at an angle of thirty degrees outwards from the axis of the inlet channel.

Korean Patent Publication No. 100725001 shows a fluidizing gas nozzle comprising a vertical fluidizing gas feed pipe and a fluidizing gas nozzle head. The fluidizing gas feed pipe protrudes centrally into an empty space in the fluidizing gas nozzle head, the empty space having a diameter greater than the outer diameter of the fluidizing gas feed pipe. Multiple outwardly inclined outlet gas channels, with an oval cross section, have an upper end at the outer circumference of the bottom of the empty space.

A well-known requirement for a fluidizing gas nozzle head is to minimize a risk of back shifting of bed material from the fluidized bed to the fluidizing gas supply at low operation loads of the fluidized bed reactor. The back shifting, which usually results from local pressure variations in the fluidized bed, is very sensitive to the design details of the fluidizing gas nozzle head.

An object of the present invention is to provide a grid nozzle that is durable in harsh operating conditions and in which the gas flow is optimized, so as to minimize the risk of back shifting even at low operating loads.

SUMMARY OF THE INVENTION

According to one aspect, the present invention provides a fluidizing gas nozzle head suitable to be connected to a fluidizing gas feeding device of a fluidized bed reactor, the fluidizing gas nozzle head comprising an inlet channel having a longitudinal axis, an inlet end, and a second end, the inlet end of the inlet channel being adapted to connect the inlet channel in vertical gas flow connection with the fluidizing gas feeding device, four outlet channels, each of the four outlet channels extending from a first end to an outlet end, and a gas distribution space having a bottom face and a ceiling opposite to the bottom face, wherein the second end of the inlet channel and the first ends of the four outlet channels are connected to direct gas flow connection with the gas distribution space, wherein each of the first ends of the four outlet channels has a central point, which central points define a rectangle with two long sides and two short sides having an aspect ratio of at least 2:1.

A fluidizing gas nozzle head with four outlet channels arranged in the form of a rectangle with long and short sides deviates from a conventional symmetrical nozzle head in that it distributes the fluidizing gas especially to two horizontally opposite directions whereby it enables rendering an ideal flow of gas in the gas distribution space while maintaining a stable and balanced split of the fluidizing gas flow.

According to a preferred embodiment of the present invention, the second end of the inlet channel and the first ends of the four outlet channels are directly connected to the bottom face of the gas distribution space. Advantageously, the bottom face of the gas distribution space has a generally rectangular cross section perpendicular to the longitudinal axis of the inlet channel, and each of the second end of the inlet channel and the first ends of the four outlet channels has a rectangular cross section, especially advantageously, a square cross section. Thereby, the cross sections of the second end of the inlet channel and the first ends of the four outlet channels are advantageously arranged so as to substantially cover the cross section of the bottom face of the gas distribution space. Such an arrangement of the cross sections is advantageous for forming a compact fluidizing gas nozzle head. The arrangement of rectangular ends of the inlet channel and the outlet channels in the gas distribution space provides a compact geometry and ideal flow paths for dividing the fluidizing gas to the outlet channels.

The gas distribution space is advantageously symmetrical with respect to a symmetry plane, which symmetry plane is perpendicular to the long sides of the rectangle defined by the central points of the first ends of the four outlet channels. Thereby, an extension of the longitudinal axis of the inlet channel lies along the symmetry plane, and the first ends of the four outlet channels are symmetrically in the gas distribution space so that the first ends of two outlet channels of the four outlet channels are located on each side of the symmetry plane. Thereby, the distance between the first ends of two outlet channels located on the same side of the symmetry plane is less than the distance between the first ends of two outlet channels on the opposite sides of the symmetry plane.

The gas distribution space may be a generally free space, but according to an especially advantageous embodiment of the present invention, the gas distribution space is divided to two generally identical halves by a vertical division wall parallel to the long sides of the rectangle defined by the central points of the first ends of the four outlet channels so that two of the first ends are located on each side of the division wall. The division wall preferably extends from the ceiling of the gas distribution space to the bottom face thereof. The division wall effectively increases the length of the outlet channels and thereby prevents pressure pulsation between the adjacent outlet channels. Thus, the division wall ascertains uniform flow of gas to each outlet channel and thereby minimizes the risk of back shifting of bed material through the nozzle to the gas supply.

According to a preferred embodiment of the present invention, a partition wall connected to the ceiling is arranged in the symmetry plane, perpendicular to the division wall mentioned above, of the gas distribution space. Such a partition wall guides the flow of fluidizing gas in the gas distribution space so that an equal volume of gas flows to the pairs of outlet channels in the two sides of the symmetry plane. In order to be efficient, the partition wall advantageously extends from the ceiling a distance of at least 40% of the distance from the ceiling to the bottom face. According to an especially advantageous embodiment of the present invention, the partition wall extends from the ceiling to the inlet channel. Thereby, the risk of uneven distribution of fluidizing gas to the outlet channels, related to uneven bed pressure in the reactor, is minimized.

Based on the compact arrangement of the inlet channel, the gas distribution space, and the four outlet channels, the fluidizing gas nozzle head has advantageously also a compact external shape. Thereby, the inlet channel, the gas distribution space and the four outlet channels are preferably enclosed by a common smooth surface. Such a shape is especially durable in the eroding and/or corrosive conditions of a fluidized bed reactor. Such a compact fluidizing gas nozzle head is advantageously manufactured by casting.

Each of the four outlet channels advantageously comprises a vertically extending, advantageously at least nearly vertical, upper portion. Thereby, when the second end of a vertical inlet channel and the first ends of the four outlet channels are directly connected to the bottom face of the gas distribution space, the fluidizing gas flow makes in the gas distribution space at least a nearly full one hundred eighty degrees turn, which decreases the risk of back shifting of bed material particles when compared, for example, with nozzles having outlet channels tilted by thirty degrees from a vertical axis of the inlet channel. In order to enable smooth turning of the fluidizing gas in the gas distribution space, the ceiling of the gas distribution space is advantageously generally flat above the second end of the inlet channel, and has an arcuate shape above the first ends of the outlet channels so as to join the ceiling smoothly to the outlet channels.

Even when the upper portions of the outlet channels are vertical, the outlet channels advantageously have a lower portion angled outwards from the symmetry plane. An especially advantageous fluidizing gas nozzle head is formed when the vertically extending upper portions of the outlet channels are angled outwards from the symmetry plane by at least ten degrees, and the lower portion of each outlet channel is angled outwards from symmetry plane by at least ten degrees more than the upper portion of the same outlet channel. Such an outlet channel design has been noticed to provide excellent distribution of fluidizing gas to the reactor and simultaneously it enables maintaining fluidizing gas velocity profile in the outlet channels so as to minimize back shifting. According to an advantageous embodiment of the present invention, the outlet channels, or at least the lower portions thereof, are tilted outwards so that the central points of the outlet ends of the four outlet channels define a rectangle with an aspect ratio of at least 3:1.

The fluidizing gas feeding device usually comprises vertical fluidizing gas feed pipes that have a circular cross section, to each of which a fluidizing gas nozzle head according to the present invention is to be connected. Therefore, the inlet channel usually comprises an inlet end with a circular cross section. Because the inlet channel advantageously has a second end with a rectangular or square cross section, the inlet channel advantageously comprises a transition section for transforming a circular cross section to a rectangular or square cross section. Correspondingly, the outlet channels, which advantageously have a first end with a rectangular or square cross section, advantageously, have an outlet end with a circular cross section and a transition section for transforming a rectangular or square cross section to a circular cross section.

In order to further minimize back shifting of bed particles, the inlet channel and/or each of the four outlet channels advantageously comprises an in gas flow direction decreasing cross-sectional area. According to an advantageous embodiment of the present invention, the in gas flow direction decreasing cross-sectional area of the channel is realized in a transition section between two portions of the channel having circular and rectangular cross sections, respectively.

According to another aspect, the present invention relates to a fluidized bed reactor comprising multiple fluidizing gas nozzles having a fluidizing gas nozzle head according to any of the embodiments described above.

The above brief description, as well as further objects, features, and advantages of the present invention will be more fully appreciated by reference to the following detailed description of the currently preferred, but nonetheless, illustrative, embodiments in accordance with the present invention, when taken in conjunction with the accompanying drawings.

DETAILED DESCRIPTION OF THE INVENTION

Figure 1:
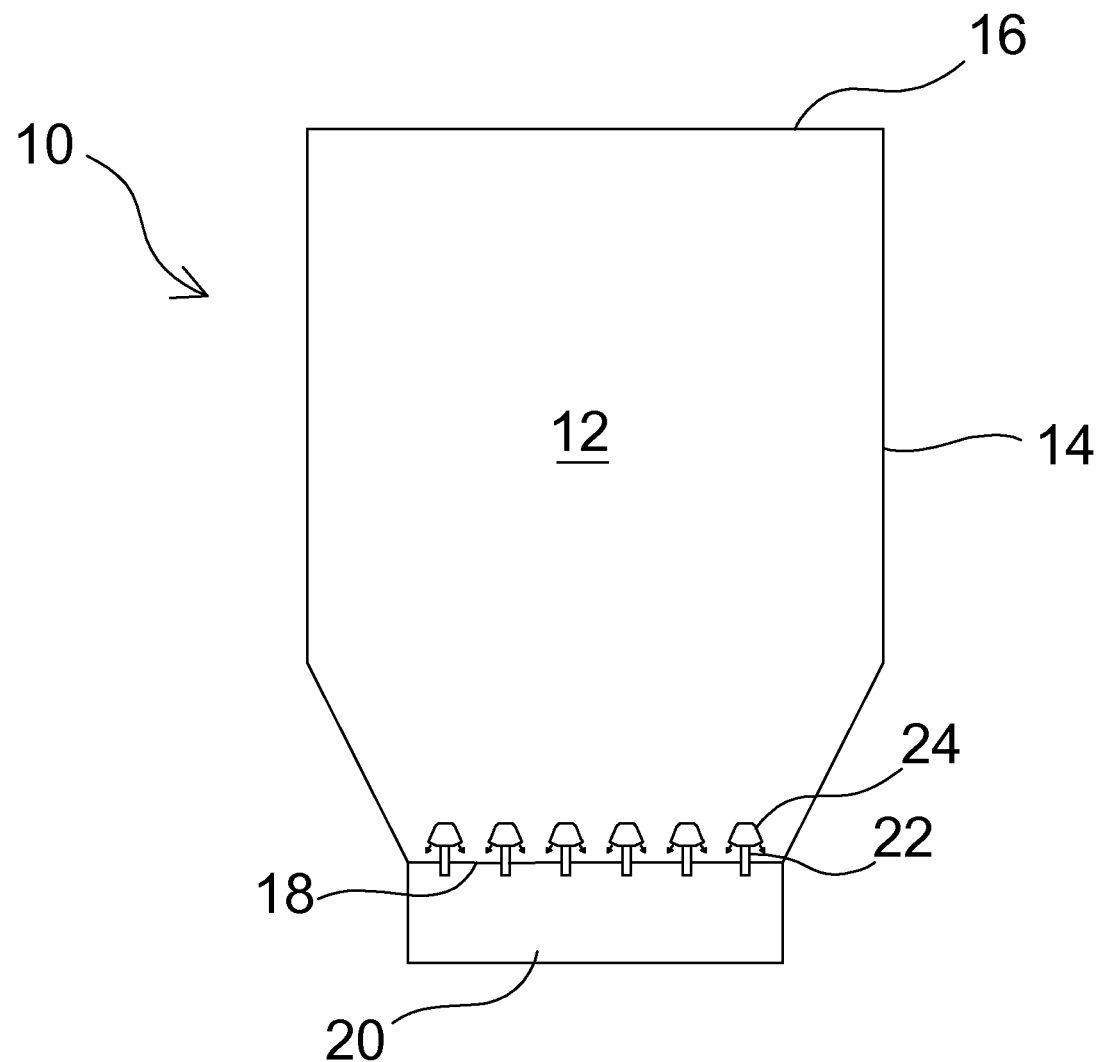
FIG. 1 schematically illustrates a fluidized bed boiler with multiple fluidizing gas nozzles.

The schematic diagram of FIG. 1 shows a fluidized bed reactor 10, which may be, for example, a circulating or bubbling fluidized bed boiler or gasifier. The fluidized bed reactor comprises a reaction chamber 12 defined by vertical side walls 14, a ceiling 16, and a bottom plate 18, and has a fluidized bed of solid particles, such as sand, limestone, ash and/or fuel particles, maintained therein. The bed is fluidized by bringing fluidizing gas, such as combustion air, from a fluidizing gas supply 20 to the reaction chamber. In FIG. 1 the fluidizing gas supply comprises a wind box arranged below the bottom plate 18, but the fluidizing gas supply could alternatively also be of another type, such as a group of so-called air bars connected to the side walls of the reaction chamber. The fluidizing gas supply 20 is provided with fluidizing gas feed pipes 22 for feeding the fluidizing gas from the fluidizing gas supply to the reactor. In FIG. 1, each of the fluidizing gas feed pipes is equipped with a fluidizing gas nozzle head 24 to provide optimal feeding of the fluidizing gas in a predetermined, relatively high velocity, and predetermined direction to the reaction chamber. A fluidized bed reactor also comprises, in practice, many other parts, such as fuel feeding nozzles, an exhaust gas channel, etc. However, because such parts are not relevant for the present invention, they are omitted from FIG. 1.

Figure 2:
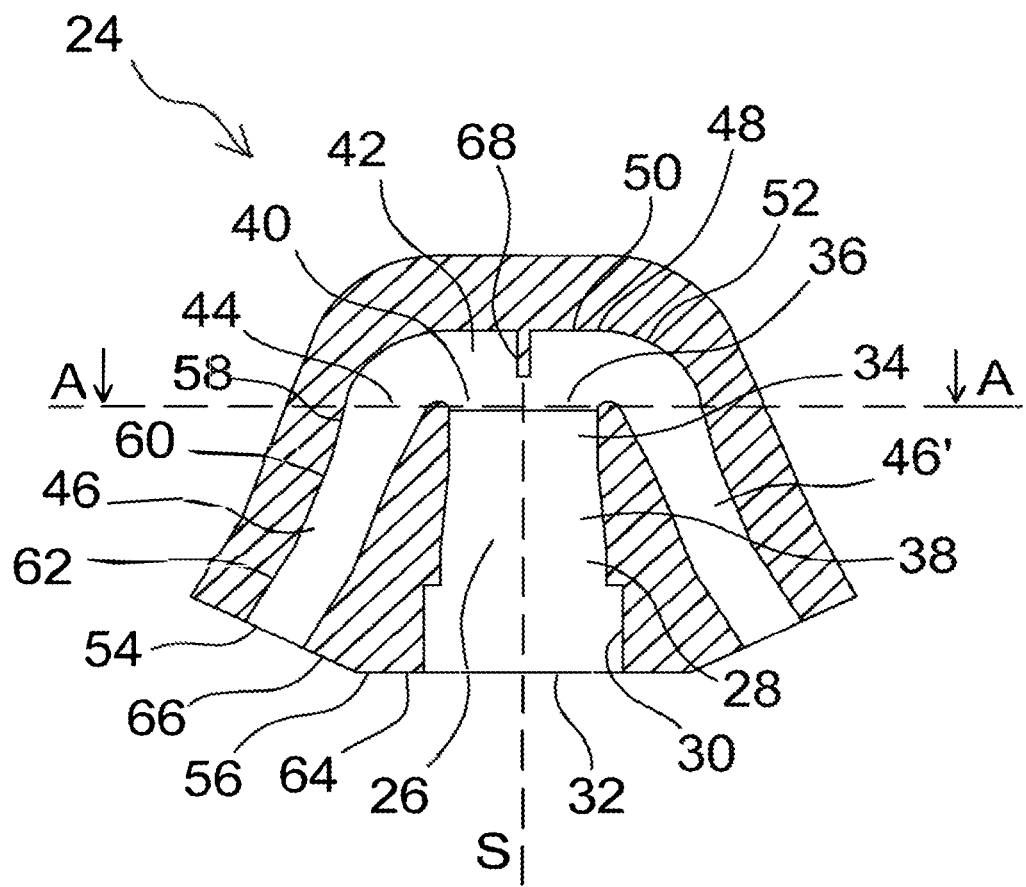
FIG. 2 schematically illustrates a vertical cross section of a fluidizing gas nozzle head according to an embodiment of the present invention.
Figure 3:
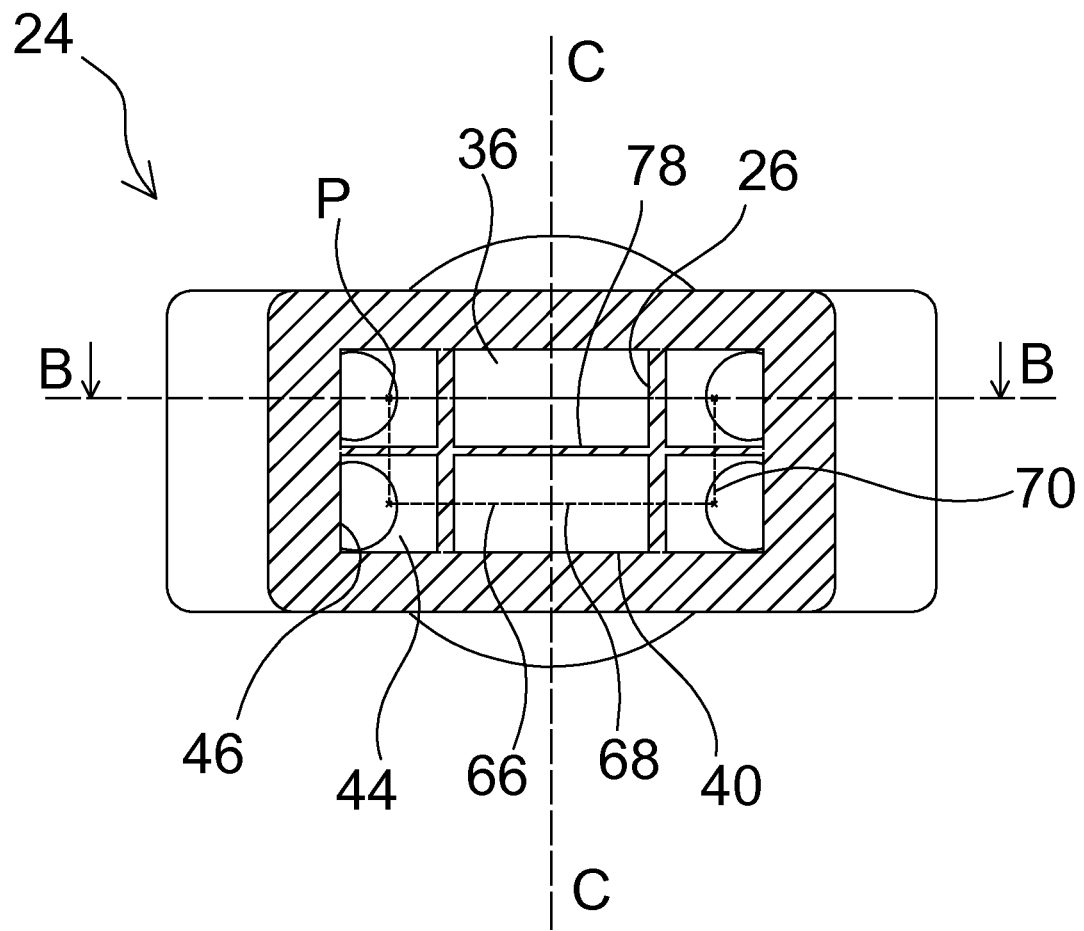
FIG. 3 schematically illustrates a horizontal cross section of a fluidizing gas nozzle head according to an embodiment of the present invention.

FIG. 2 shows a vertical cross section of a fluidizing gas nozzle head 24, along a vertical plane shown as line B-B in FIG. 3, in accordance with a preferred embodiment of the present invention. The cross section shows an inlet channel 26 with a longitudinal axis S. When the fluidizing gas nozzle head is installed in a fluidized bed reactor, the inlet channel will generally be vertical so as to feed the fluidizing gas upwards. Therefore, the use of terms such as 'lower' or 'bottom' refers to the relative position of the respective feature when the nozzle head is installed in its normal position.

The inlet channel 26 comprises an inlet portion 28 with a widened lower portion 30, into which a fluidizing gas feed pipe will be welded when the fluidizing gas nozzle head is connected to a fluidizing gas supply of a fluidized bed reactor. The means for connecting the fluidizing gas nozzle head to a fluidizing gas feeding device of a fluidized bed reactor may alternatively be of any other suitable type, such as a bayonet-type twist-lock connection, known from U.S. Pat. No. 9,333,476.

The inlet portion 28 of the inlet channel 26 comprises an inlet end 32 having a circular cross section, as will be discussed in connection with FIG. 4. The final portion of the inlet channel 26 is herein called the second portion 34, which has an upper end, a so-called second end 36, with a generally rectangular or square cross section, as will be discussed in connection with FIG. 3. Between the inlet portion 28 and the second portion 34, there is a transition portion 38 from a circular cross section to a rectangular cross section. The second end 36 of the inlet channel 26 is arranged at a bottom face 40 of a gas distribution space 42.

The gas distribution space 42 may be a generally free space, but according to an advantageous embodiment of the present invention, the gas distribution space is divided by a division wall 78 into two identical halves so that two outlet channels, such as outlet channels 46 and 46' in FIG. 2, are on the same side of the division wall 78. Thus, the gas flow entering to the nozzle head through the inlet channel 26 is first divided by the division wall 78 to the two halves of the gas distribution space, and, thereafter, to the corresponding outlet channels 46, 46'. The division wall thus effectively increases the length of the outlet channels and thereby prevents pressure pulsation between the adjacent outlet channels. The division wall thus ascertains uniform flow of gas to each outlet channel and thus minimizes the risk of back shifting of bed material through the nozzle to the gas supply.

The bottom face 40 of the gas distribution space 42 comprises, in addition to the second end 36 of the inlet channel 26, first ends 44 of four outlet channels 46 of the fluidizing gas nozzle head. Thus, the second end 36 of the inlet channel 26 and the first ends 44 of the four outlet channels 46 are connected to direct gas flow connection with the gas distribution space 42.

The shapes and arrangement of the second end 36 of the inlet channel 26 and the first ends 44 of the four outlet channels 46 will be described in detail in connection with FIG. 3. The gas distribution space 42 comprises a ceiling 48 opposite to the bottom face 40, which ceiling comprises a generally flat section 50 above the second end 36 of the inlet channel 26 and arcuate sections 52 above the first ends 44 of the outlet channels 46, so as to join the ceiling smoothly to the outlet channels.

Figure 4:
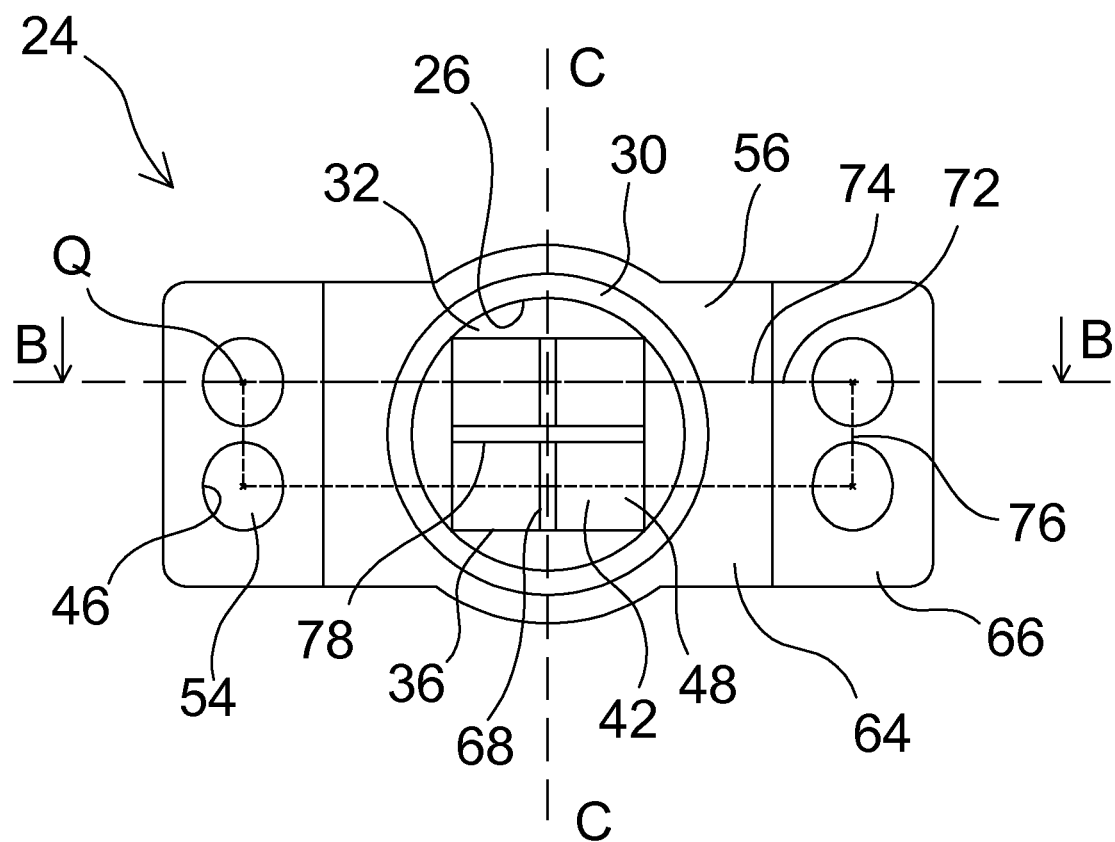
FIG. 4 schematically illustrates a plan view from below a fluidizing gas nozzle head according to an embodiment of the present invention.

FIG. 2 shows two outlet channels 46, 46' having an outlet end 54 on the lower face 56 of the fluidizing gas nozzle head 24, but, in reality, the fluidizing gas nozzle head 24 comprises four outlet channels, as can be seen from FIGS. 3 and 4. The first ends 44 of the outlet channels 46, 46' have a generally rectangular cross section, as can be seen in FIG. 3, and the outlet ends 54 of the outlet channels have a generally circular, or oval, cross section, as can be seen in FIG. 4. Thus, the outlet channels 46, 46' comprise a transition portion 58 in which the cross section of the outlet channel is transformed from rectangular to circular. Each of the four outlet channels advantageously comprises, as well as also the inlet channel 26, an in gas flow direction decreasing cross-sectional area.

Each of the four outlet channels 46, 46' advantageously comprises a vertically extending upper portion 60 and a lower portion 62 that is angled outwards from the direction of the upper portion. The upper portion may be vertical, but advantageously, it is angled outwards from vertical direction by at least ten degrees. Correspondingly, the lower portion 62 of each outlet channel 46 is advantageously angled outwards by at least ten degrees more than the upper portion 60 of the same outlet channel. The term angled outwards as used here means tilting away from a symmetry plane C-C, to be shown more clearly in FIG. 3, which plane comprises the axis S and is perpendicular to plane of FIG. 2.

The lower face 56 of the fluidizing gas nozzle head 24 comprises advantageously a horizontal central section 64, which comprises the inlet end 32 of the inlet channel 26, and upwards slanted outer sections 66, which comprise the outlet ends 54 of the four outlet channels 46. The upwards slanted outer sections 66 of the lower face 56 are generally perpendicular to the direction of the lower portions 62 of the respective outlet channels 46.

At the central symmetry plane C-C perpendicular to the plane of FIG. 2 is advantageously arranged a partition wall 68 connected to the ceiling 48. The partition wall extends advantageously from the ceiling 48 a distance of at least 40% of the distance from the ceiling 48 to the bottom face 40. It is also possible that the partition wall 68 extends from ceiling 48 to within the inlet channel 26, for example, to the second portion 34 of the inlet channel 26.

The fluidizing gas nozzle head 24 according to the present invention has generally a compact external shape, wherein the inlet channel 26, the gas distribution space 42 and the four outlet channels 46 are all enclosed by a common smooth surface. The nozzle head is advantageously manufactured by casting of a durable material, such as austenitic, stainless steel that is applicable at high temperatures. Thus, the nozzle head is especially durable in harsh operating conditions of a fluidized bed reactor.

FIG. 3 shows a cross-sectional view of the fluidizing gas nozzle head 24 of FIG. 2 along a horizontal plane shown as a line A-A in FIG. 2. FIG. 3 generally shows, at the central portion of the cross section, the bottom face 40 of the gas distribution space 42, and, more particularly, the second end 36 of the inlet channel 26 and the first ends 44 of four outlet channels 46. At the center of the gas distribution space 42 can be seen a partition wall 78 that extends from the ceiling of the gas distribution space generally to the level of the bottom face thereof.

As is seen in FIG. 3, each of the second end 36 of the inlet channel 26 and the first ends 44 of the of the four outlet channels 46 has a generally rectangular cross section. The bottom face 40 of the gas distribution space has a generally rectangular cross section that is substantially covered by the second end 36 of the inlet channel 26 and the four first ends of the outlet channels 46.

FIG. 3 also shows central points P of the first ends 44 of the four outlet channels 46. According to the present invention, the central points P define a rectangle 66 with two long sides 68 and two short sides 70 having preferably an aspect ratio of at least 2:1, even more preferably, at least 3:1. As can be seen from FIG. 3, the gas distribution space is symmetrical with respect to a symmetry plane C-C perpendicular to the long sides 68. Thus, the first ends 44 of the four outlet channels 46 are arranged symmetrically in the gas distribution space so that the first ends of two outlet channels are located side by side on each side of the symmetry plane C-C.

FIG. 4 shows a plan view of the fluidizing gas nozzle head 24 as seen towards the lower face 56 of the nozzle head. Thus, it is seen that the inlet end 32 of the inlet channel 26, at the horizontal central section 64 of the lower face 56, and each of the outlet ends 54 of the outlet channels 46, at the upwards slanted sections 66 of the lower face 56, has a circular cross section. FIG. 4 also shows the edge of the widened portion 30 of the inlet channel 24. Through the inlet channel 26 can also be seen the square cross section of the second end 36 of the inlet channel 26 and the division wall 78 of the gas distribution space. FIG. 4 also shows the partition wall 68 connected along the symmetry plane C-C to the ceiling 48 of the gas distribution space 42.

Because the outlet channels 46 are angled outwards from the symmetry plane C-C, the central points Q of the outlet ends 54 of the outlet channels 46 define a rectangle 72 with two long sides 74 and two short sides 76 having an aspect ratio that is greater than that of the first ends of the outlet channels discussed above in connection with FIG. 3.

Thereby the aspect ratio of the rectangle 72 is preferably at least 3:1, even more preferably, at least 5:1.

While the invention has been described herein by way of examples in connection with what are at present considered to be the most preferred embodiments, it is to be understood that the invention is not limited to the disclosed embodiments, but is intended to cover various combinations or modifications of its features, and several other applications included within the scope of the invention as defined in the appended claims.

The invention claimed is:

1. A fluidizing gas nozzle head suitable to be connected to a fluidizing gas feeding device of a fluidized bed reactor, the fluidizing gas nozzle head comprising:
   (A) an inlet channel having a longitudinal axis, an inlet end, and a second end, the inlet end of the inlet channel being adapted to connect the inlet channel in vertical gas flow connection with the fluidizing gas feeding device;
   (B) four outlet channels, each of the four outlet channels extending from a first end to an outlet end;
   (C) a gas distribution space having a bottom face and a ceiling opposite to the bottom face; and
   (D) a partition wall connected to the ceiling and arranged in a symmetry plane of the gas distribution space,
   wherein the second end of the inlet channel and the first ends of the four outlet channels are in direct gas flow connection within the gas distribution space, and
   wherein each of the first ends of the four outlet channels has a central point, which central points define a rectangle with two long sides and two short sides having an aspect ratio of at least 2:1, and the gas distribution space being divided by a division wall into two identical halves so that two outlet channels are on the same side of the division wall.

2. The fluidizing gas nozzle head according to claim 1, wherein the second end of the inlet channel and the first ends of the four outlet channels are directly connected to the bottom face of the gas distribution space.

3. The fluidizing gas nozzle head according to claim 2, wherein the bottom face of the gas distribution space has a generally rectangular cross section perpendicular to the longitudinal axis of the inlet channel, and each of the second end of the inlet channel and the first ends of the four outlet channels has a rectangular cross section.

4. The fluidizing gas nozzle head according to claim 3, wherein the cross sections of the second end of the inlet channel and the first ends of the four outlet channels substantially cover the cross section of the bottom face of the gas distribution space.

5. The fluidizing gas nozzle head according to claim 1, wherein each of the outlet ends of the four outlet channels has a central point, and the four outlet channels are arranged so that the central points of the outlet ends define a rectangle with an aspect ratio of at least 3:1.

6. The fluidizing gas nozzle head according to claim 1, wherein the gas distribution space is symmetrical with respect to the symmetry plane perpendicular to the long sides of the rectangle defined by the central points of the first ends of the four outlet channels.

7. The fluidizing gas nozzle head according to claim 6, wherein an extension of the longitudinal axis of the inlet channel lies along the symmetry plane, and the first ends of the four outlet channels are symmetrically in the gas distribution space so that the first ends of two outlet channels of the four outlet channels are located on each side of the symmetry plane.

8. The fluidizing gas nozzle head according to claim 7, wherein each of the four outlet channels comprises a vertically extending upper portion and a lower portion angled outwards from the symmetry plane.

9. The fluidizing gas nozzle head according to claim 8, wherein the vertically extending upper portion of each of the four outlet channels is angled outwards from the symmetry plane by at least ten degrees, and the lower portion of each outlet channel is angled outwards from symmetry plane by at least ten degrees more than the upper portion of the same outlet channel.

10. The fluidizing gas nozzle head according to claim 6, wherein the division wall is arranged perpendicular to the symmetry plane and extends from the ceiling to the bottom face.

11. The fluidizing gas nozzle head according to claim 1, wherein the partition wall extends from the ceiling a distance of at least 40% of the distance from the ceiling to the bottom face.

12. The fluidizing gas nozzle head according to claim 1, wherein the fluidizing gas nozzle head has a compact external shape, and the inlet channel, the gas distribution space and the four outlet channels are enclosed by a common smooth surface.

13. The fluidizing gas nozzle head according to claim 1, wherein the ceiling of the gas distribution space comprises a generally flat portion above the second end of the inlet channel, and has an arcuate portion above the first ends of the four outlet channels so as to join the ceiling smoothly to the outlet channels.

14. The fluidizing gas nozzle head according to claim 1, wherein each of the four outlet channels comprises an in gas flow direction decreasing cross-sectional area.

15. The fluidizing gas nozzle head according to claim 1, wherein the partition wall is perpendicular to the division wall and guides the flow of fluidizing gas in the gas distribution space so that an equal volume of gas flows to the respective two outlet channels on each side of the division wall.

16. A fluidized bed reactor comprising:
a fluidizing gas feeding device connected to multiple fluidizing gas nozzle heads, each fluidizing gas nozzle head comprising:
(A) an inlet channel having a longitudinal axis, an inlet end, and a second end, the inlet end of the inlet channel being adapted to connect the inlet channel in vertical gas flow connection with the fluidizing gas feeding device;
(B) four outlet channels, each of the four outlet channels extending from a first end to an outlet end;
(C) a gas distribution space having a bottom face and a ceiling opposite to the bottom face; and
(D) a partition wall connected to the ceiling and arranged in a symmetry plane of the gas distribution space,
wherein the second end of the inlet channel and the first ends of the four outlet channels are in direct gas flow connection within the gas distribution space, and
wherein each of the first ends of the four outlet channels has a central point, which central points define a rectangle with two long sides and two short sides having an aspect ratio of at least 2:1, and the gas distribution space being divided by a division wall into two identical halves so that two outlet channels are on the same side of the division wall.

17. The fluidized bed reactor according to claim 16, wherein the second end of the inlet channel and the first ends of the four outlet channels are directly connected to the bottom face of the gas distribution space.

18. The fluidized bed reactor according to claim 16, wherein the bottom face of the gas distribution space has a generally rectangular cross section perpendicular to the longitudinal axis of the inlet channel, and each of the second end of the inlet channel and the first ends of the four outlet channels has a rectangular cross section.

19. The fluidized bed reactor according to claim 16, wherein the cross sections of the second end of the inlet channel and the first ends of the four outlet channels substantially cover the cross section of the bottom face of the gas distribution space.

20. The fluidized bed reactor according to claim 16, wherein each of the outlet ends of the four outlet channels has a central point, and the four outlet channels are arranged so that the central points of the outlet ends define a rectangle with an aspect ratio of at least 3:1.

21. The fluidized bed reactor according to claim 16, wherein the gas distribution space is symmetrical with respect to the symmetry plane perpendicular to the long sides of the rectangle defined by the central points of the first ends of the four outlet channels.

22. The fluidized bed reactor according to claim 16, wherein an extension of the longitudinal axis of the inlet channel lies along the symmetry plane, and the first ends of the four outlet channels are symmetrically in the gas distribution space so that the first ends of two outlet channels of the four outlet channels are located on each side of the symmetry plane.

23. The fluidized bed reactor according to claim 16, wherein the partition wall extends from the ceiling a distance of at least 40% of the distance from the ceiling to the bottom face.

24. The fluidized bed reactor according to claim 16, wherein the fluidizing gas nozzle head has a compact external shape, and the inlet channel, the gas distribution space, and the four outlet channels are enclosed by a common smooth surface.

25. The fluidized bed reactor according to claim 16, wherein the division wall is arranged perpendicular to the symmetry plane and extends from the ceiling to the bottom face.

26. The fluidized bed reactor according to claim 16, wherein each of the four outlet channels comprises a vertically extending upper portion and a lower portion angled outwards from the symmetry plane.

27. The fluidized bed reactor according to claim 16, wherein the vertically extending upper portion of each of the four outlet channels is angled outwards from the symmetry plane by at least ten degrees, and the lower portion of each outlet channel is angled outwards from symmetry plane by at least ten degrees more than the upper portion of the same outlet channel.

28. The fluidized bed reactor according to claim 16, wherein the ceiling of the gas distribution space comprises a generally flat portion above the second end of the inlet channel, and has an arcuate portion above the first ends of the four outlet channels so as to join the ceiling smoothly to the outlet channels.

29. The fluidized bed reactor according to claim 16, wherein each of the four outlet channels comprises an in gas flow direction decreasing cross-sectional area.

30. The fluidized bed reactor according to claim 16, wherein the partition wall is perpendicular to the division wall and guides the flow of fluidizing gas in the gas distribution space so that an equal volume of gas flows to the respective two outlet channels on each side of the division wall.

* * * * *